US009818178B1

(12) United States Patent
Mogre et al.

(10) Patent No.: US 9,818,178 B1
(45) Date of Patent: Nov. 14, 2017

(54) METHOD AND SYSTEM FOR DETECTION OF GHOSTING ARTIFACT IN A VIDEO

(71) Applicant: Interra Systems, Inc., Cupertino, CA (US)

(72) Inventors: Advait Madhav Mogre, Sunnyvale, CA (US); Bhupender Kumar, Palwal (IN); Pervez Alam, New Delhi (IN); Rishi Gupta, Noida (IN); Shekhar Madnani, Noida (IN)

(73) Assignee: Interra Systems, Inc., Cupertino, CA (US)

( * ) Notice: Subject to any disclaimer, the term of this patent is extended or adjusted under 35 U.S.C. 154(b) by 0 days.

(21) Appl. No.: 15/210,854

(22) Filed: Jul. 14, 2016

(51) Int. Cl.
*G06T 5/00* (2006.01)
*G06T 7/00* (2017.01)
*G06T 5/20* (2006.01)
*H04N 5/21* (2006.01)

(52) U.S. Cl.
CPC ............... *G06T 5/002* (2013.01); *G06T 5/20* (2013.01); *G06T 7/0026* (2013.01); *G06T 7/0085* (2013.01); *H04N 5/211* (2013.01); *G06T 2207/10016* (2013.01); *G06T 2207/20032* (2013.01); *G06T 2207/20192* (2013.01)

(58) Field of Classification Search
CPC ........ H04N 5/211; G06K 9/40; G06K 9/4638; G06T 5/002
See application file for complete search history.

(56) References Cited

U.S. PATENT DOCUMENTS

| 5,311,315 A * | 5/1994 | Sakata ............... H04N 17/00 348/614 |
| 2015/0002704 A1* | 1/2015 | Vidal-Naquet ...... H04N 5/2355 348/241 |

* cited by examiner

*Primary Examiner* — Brian P Werner
(74) *Attorney, Agent, or Firm* — Next IP Law Group

(57) ABSTRACT

A method and system for ghost detection in an image are described. Initially, a mode for detecting ghosting artifact is determined for deciding whether to perform analog or inter field ghosting analysis on the image. Based on the determined mode, a plurality of fields is determined to generate a field overlay image. The image is updated based on the field overlay image and an inter-field average of absolute difference is computed. A significant edge image, a principal edge image, and a delta gradient image are generated. A confidence score indicative of a likelihood of ghosting artifact in the image, is computed based on at least the inter-field average of absolute difference, a first and a second count of pixels in the delta gradient image, a third count of pixels in the principal edge image, and a count of rows of the significant edge image that correspond to the ghosting artifact.

13 Claims, 6 Drawing Sheets

METHOD AND SYSTEM FOR DETECTION OF GHOSTING ARTIFACT IN A VIDEO

FIELD OF THE DISCLOSURE

The present disclosure is generally related to ghost detection in a video, and more particularly to ghost detection in an image without the use of a reference signal.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Ghosting is a phenomenon in which a replica of the received signal (audio and/or video) is super-imposed on the original signal. In case of an audio signal, such a replica may correspond to an echo of the original signal. In case of video signal, such a replica may be visible as one or more secondary boundaries around a significant boundary of one or more objects present in the original signal. In the analog domain, the ghosting phenomenon is common in scenarios in which the signal received by the receiver undergoes multiple reflections due to the obstacles present in the communication channel. It can also occur due to the reflections caused by impedance mismatch along the communication channel. Another form of ghosting manifests itself as edge misalignment of moving objects, or 'shadowing', within a given frame. Such frames may be captured in an interlaced video format one field at a time, and then subsequently weaved back together during display.

To detect and minimise the ghosting in the received signal, numerous methods have been developed. Such methods are based on transmission of a reference signal along with the original signal. In accordance with one of such techniques in the case of analog capturing of content, a Ghost Cancelling Reference (GCR) signal is transmitted along with the original signal during the Vertical Blanking Interval (VBI). A comparison is performed at the receiver between the original signal and the received signal based on the GCR signal, to minimise the ghosting. Other methods to detect and minimise ghosting that do not require reference signal have also been developed, for example, during High Dynamic Range (HDR) image generation that is typically used in the case of ghosting created during scene capture which has motion.

The ghost detection and minimisation based on inclusion of a reference signal along with the original signal is susceptible to errors. This is because along with the original signal, the reference signal may be transcoded and reformatted during transmission. As a result, any change in the reference signal may result in erroneous detection of the principal and/or secondary boundaries of one or more objects in the received signal. Further, the reference signal is an overhead as it is only used for a part of the decoding process.

BRIEF SUMMARY

It will be understood that this disclosure in not limited to the particular systems, and methodologies described, as there can be multiple possible embodiments of the present disclosure which are not expressly illustrated in the present disclosure. It is also to be understood that the terminology used in the description is for the purpose of describing the particular versions or embodiments only, and is not intended to limit the scope of the present disclosure.

In view of the problems mentioned above, in case of analog capturing of the content the present disclosure provides methods and system for detecting and minimising the secondary boundaries without the use of a reference signal. Moreover, the present disclosure discloses techniques for detecting ghosting artefacts in a computationally efficient manner.

In an example embodiment, a method and a system for ghost detection in a video or an image is provided. Firstly, a mode of ghosting artefact detection is determined based on one or more user inputs. The mode may comprise a first mode and a second mode for ghosting artefact detection. Then a plurality of fields is determined based on splitting of the image into the plurality of fields. The plurality of fields may be split when the determined mode of the ghosting artefact corresponds to the first mode. A field overlay image is generated based on the determined plurality of fields. The image may be updated based on the generated field overlay image. Further, an inter-field average of absolute difference may be computed between the determined plurality of fields of the updated image. The method may further comprise pre-processing the image to filter out speckled noise speckled noise. Subsequently, an edge image may be extracted based on extraction of gradient magnitude and gradient angle of each pixel of the pre-processed image.

The method may further comprise determination of a maximum absolute gradient magnitude for each row of the edge image based on the gradient magnitude of each pixel in each row of the edge image. Further, a first predefined percentage of a maximum gradient magnitude and a second predefined percentage of a maximum gradient magnitude associated with each of one or more rows of pixels of the image may be determined. A significant edge image is then generated by comparing gradient magnitudes of each pixel in each of one or more rows of pixels of the significant edge image, with the determined first predefined percentage of the maximum absolute gradient magnitude of the row. A noise reduced significant edge image may be generated based on performing median filtering on the generated significant edge image. The method may further comprise generation of a principal edge image, based on comparison of gradient magnitudes of each pixel in each of one or more rows of pixels of the principal edge image, with the determined second predefined percentage of the maximum absolute gradient magnitude of the row Further, boundary neighbourhood information may be generated based on the generated principal edge image.

The method may further comprise generation of a delta gradient image based on processing of the determined edge image. The method further comprises determination of a first count of pixels and a second count of pixels in the computed delta gradient image. Such a determination may be based on a spatial alignment of one or more pixels in the delta gradient image and the generated boundary neighbourhood information. A third count of pixels that corresponds to a thickness of a boundary of an object may be determined in the generated principal edge image. A row-wise autocorrelation of one or more gradient magnitudes of a noise reduced significant edge image may be performed to determine an autocorrelation profile associated with each of one or more rows of pixels of the noise reduced significant edge image. Further, a presence of convexity and a presence of combness in each of the determined autocorrelation profile associated with each of one or more rows of pixels of the noise reduced significant edge image may be determined. Based on the determined presence of convexity and the determined presence of combness, a count of rows of each of one or more rows of pixels of the noise reduced significant edge image that correspond to the ghosting artefact. The method may further comprise computation of a confidence score indicative of a likelihood of occurrence of the ghosting artefact in the image. The confidence score may be computed based on at least the computed inter-field average of absolute difference, the determined first count of pixels and the second count of pixels, the determined third count of pixels, and the determined count of rows of the noise reduced significant edge image that correspond to the ghosting artefact.

Other systems, methods, features and advantages will be, or will become, apparent to one with skill in the art upon examination of the following figures and detailed description. It is intended that all such additional systems, methods, features and advantages be included within this description, be within the scope of the embodiments, and be protected by the following claims and be defined by the following claims. Further aspects and advantages are discussed below in conjunction with the description.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. Boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Some embodiments of this disclosure, illustrating all its moments, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the preferred, systems and methods are now described.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Figure 1:
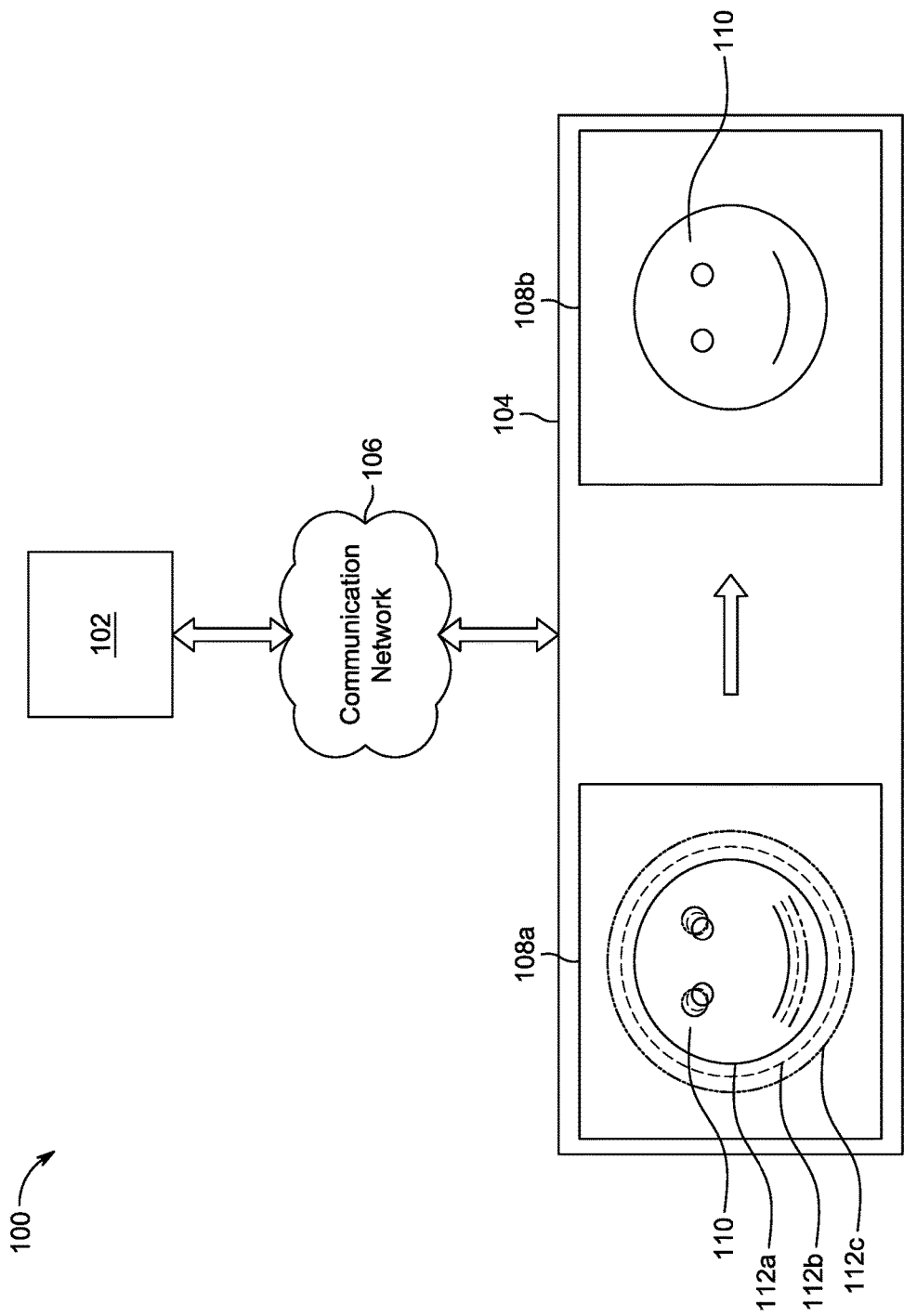
FIG. 1 is a block diagram of a network environment for ghost detection, according to an embodiment.

FIG. 1 is a block diagram of a network environment for ghost detection, according to an embodiment. According to an embodiment, video signals may be transmitted from one of the one or more heterogeneous video source 102 that may correspond to a video database, a content server, cloud storage, and/or any other storage means connected to an electronic device 104. The electronic device 104 may be connected to the video sources by means of a communication network 106, such as a local area network, internet, and/or the like. The electronic device 104 may be operable to receive video that comprise one or more images, from the according to the methods described herein. In an aspect, the electronic device 104 may correspond to a television (TV), laptop, desktop, smartphone, or any other apparatus having at least a memory means and a processor. In certain aspects, the video may be stored in a memory means of the electronic device 104 and no external source may be required.

In an example embodiment, the video of the video source may correspond to an analog video. The analog video content may undergo multipath fading numerous reflections due to man-made and/or natural obstacles present in the communication network 106. Consequently, the rendered video at the electronic device 104 may comprise ghosting artefacts wherein the rendered video may comprise one or more false boundaries associated with that one or more objects that may be present in the images of the video. The ghosting artefact may be observed in the rendered video at the electronic device 104, due to impedance mismatch along the communication network 106. For example, when an image of the received video comprises an object 110, due to the multipath fading the image 108a rendered at the electronic device 104 may comprise a principal edge 112a, a spatially aligned first secondary edge 112b, and a spatially aligned second secondary edge 112c. The first secondary edge 112b and the spatially aligned second secondary edge 112c may correspond to ghosting artefacts. In an instance, the first secondary edge 112b may be offset from the principal edge 112a by a first distance and the spatially aligned second secondary edge 112c may be offset from the first secondary edge 112b by a second distance. The first distance and the second distance may be based on one or more factors associated with the communication network 106. In another embodiment, the electronic device 104 may detect inter-field ghosting artefact associated with the received interlaced video. Such inter-field ghosting may appear after interlacing operation is performed on the video. The inter-field ghosting may be perceived after the deinterlacing operation is performed on the received interlaced video for image reconstruction. A person of ordinary skill in the art will appreciate that the electronic device 104 may detect both inter-field ghosting and analog ghosting, without limiting the scope of the disclosure.

In an aspect, the electronic device 104 may determine a mode for detection of the ghosting artefact. In an aspect, a first mode may correspond to detection of the inter-field ghosting artefact, and a second mode may correspond to the analog ghosting artefact associated with the received video. The determination of the mode may be based on an input provided by a user associated with the electronic device 104. Such an input may be provided via a user interface associated with the electronic device 104.

In an aspect, when the user input corresponds to the first mode for inter-field ghosting artefact detection, the electronic device 104 may split the one or more images associated with the received video into a plurality of fields. The plurality of fields may comprise one or more top fields and one or more bottom fields. Based on the plurality of fields, the electronic device 104 may further generate a field overlay image. The electronic device 104 may further compute an inter-field average of absolute difference based on the determined plurality of fields.

In an aspect, the electronic device 104 may calculate gradient magnitudes for each of the pixels of the one or more image associated with the received video, when the user input corresponds to either the first mode or the second mode. The electronic device 104 may further calculate gradient angles for each of the pixels of the one or more image associated with the received video. The electronic device 104 may further determine an edge image based on the computed gradient magnitudes for each of the pixels of the one or more images. The electronic device 104 may further determine a principal (boundary) edge image that corresponds to the principal boundary 112a of the object 110. Based on the principal edge image, the electronic device 104 may extract boundary neighbourhood information. The extraction of the boundary neighbourhood information may be based on determination of whether a pixel at a location in the principal edge image corresponds to the boundary of the principal edge image, and the pixels present in an immediate vicinity of the boundary of the principal edge image based on a first programmable parameter. Further, the extraction of the boundary neighbourhood information may be based on determination of whether a pixel at a location in the principal edge image corresponds to the boundary of the principal edge image, and the pixels present in an extended vicinity of the boundary of the principal edge image based on a second programmable parameter. The electronic device 104 may further determine a significant edge image that corresponds to the first secondary edge 112b of the object 110. The electronic device 104 may further generate a delta gradient image based on processing of the determined edge image. Such generated delta gradient image attempts to capture gradients that correspond to the ghosting artefacts associated with the one or more images of the received video.

The electronic device 104 may determine a first count of pixels and a second count of pixels in the generated delta gradient image, using at least the gradient angle generated in the edge detection module in conjunction with the generated boundary neighbourhood information. In an aspect, the first count of pixels correspond to a count of pixels having ringing artefacts, present around the immediate neighbourhood of the boundary of the object, which is determined based on a first plurality of programmable thresholds. The second count of pixels correspond to a count of pixels having ghost artefacts, present around an extended neighbourhood of the boundary of the object, which is determined based on a second plurality of programmable thresholds.

The first count and the second count of pixels may be determined based on a spatial alignment of one or more pixels that correspond to the ghosting artefact associated with the object 110, wherein the spatial alignment is based on the determined gradient angle and a comparison of the difference of a gradient of a pixel with the gradient of a reference pixel present at locations corresponding to non-zero pixels in the delta gradient image. The electronic device 104 may further determine a third count of pixels that correspond to the thickness of the boundary of the object 110, in the generated principal edge image.

The electronic device 104 may further determine an autocorrelation profile associated with each of the one or more rows of pixels of a noise reduced version of the generated significant edge image. This noise reduction may be achieved by filtering techniques that include, but are not limited to, a median filtering technique. Based on the determined autocorrelation profile, the electronic device 104 may perform a row-wise autocorrelation of the one or more gradients of the noise reduced significant edge image. Further, the electronic device 104 may determine a presence of convexity and a presence of combness of each of the determined autocorrelation profile. In an aspect, the presence of combness is determined based on determination of local maximas present in the determined autocorrelation profile associated with each row of the generated significant edge image. The magnitude of the determined local maximas is compared with a combness threshold to determine significant local maximas. Further, a count of determined significant local maximas which are equi-distant is determined by the electronic device 104, based on a computation of a second order difference between successive significant local maximas. The determined count of equi-distant significant local maximas may be compared with a programmable combness threshold to determine the presence of combness in the determined autocorrelation profile.

Finally, the electronic device 104 may compute a confidence score that may be based on the computed inter-field average of absolute difference, the determined first count, second count, and the third count of pixels, the determined count of rows of the noise reduced significant edge image that correspond to the ghosting artefact associated with the object 110. The computed confidence score may be indicative of a likelihood of occurrence of the ghosting artefacts.

In an aspect, the electronic device 104 may perform one or more operation to minimise or remove the ghosting artefact, based on the computed confidence score. Such operation may result in generation of an image 108b that comprises the object 110 and the significant boundary 112a. However, the first secondary edge 112b and the spatially aligned second secondary edge 112c are removed due to ghosting minimisation performed by the electronic device 104.

In an aspect, the first mode may correspond to detection of an inter-field ghosting artefact in the image 108a. The second mode may correspond to detection of an analog ghosting artefact in the image 108a. The image 108a of the received video may be generated by pre-processing the image 108a based on median filtering technique. The edge detection may be performed on the pre-processed image 108a to generate one or more gradients associated with the each of the pixels of the image. The extracted first predefined percentage of a maximum gradient magnitude, of a row of the one or more rows of pixels of the image 108a, corresponds to a maximum significant gradient magnitude of the row. The extracted second predefined percentage of a maximum gradient magnitude, of a row of the one or more rows of pixels of the image 108a, may correspond to a maximum boundary gradient magnitude of the row. The one or more gradient magnitudes associated with the generated raw delta gradients may be compared with a threshold proportional to the maximum gradient magnitude to remove noise gradients and generate the delta gradient image.

In an aspect, the confidence score may be computed based on one or more predefined parameters that may be stored at a local memory associated with the electronic device 104. In an example embodiment, the one or more pre-defined system parameters may be user configurable. Further, the confidence score may be computed when the determined third count of pixels is non-zero. The computed confidence score may correspond to a non-zero value when the determined first count of pixels is non-zero and the determined first count of pixels is greater than the determined second count of pixels.

Figure 2:
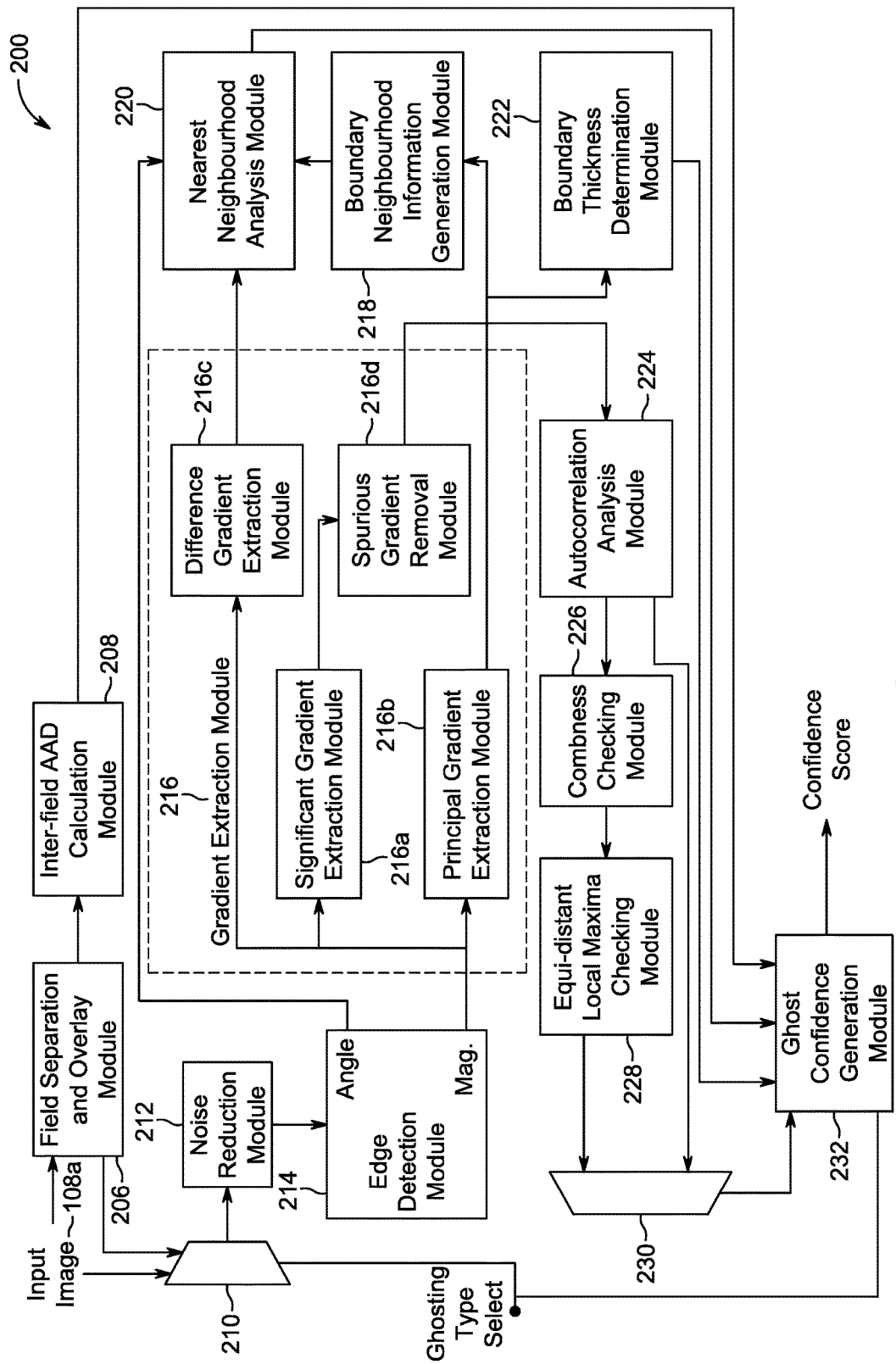
FIG. 2 is a block diagram of a system for ghost detection, according to an embodiment.

FIG. 2 is a block diagram of a system for ghost detection, according to an embodiment. With reference to the region diagram 200, there are shown one or more units of the electronic device 104. FIG. 2 is explained in conjunction with the elements disclosed in FIG. 1. In an implementation, the electronic device 104 may correspond to a laptop, desktop, smartphone, or any other apparatus having at least a central processing unit (CPU) 202 (not shown) and a memory means 204 (not shown). The received video from the video source 102 may be stored in the memory 204 of the electronic device 104 and no external source may be required.

The CPU 202 executes computer program instructions stored in the memory 204. The CPU 202 may also be configured to decode and execute any instructions received from the video source 102 through the communication network 106. The CPU 202 may also execute one or more client applications. The CPU 202 may include one or more general purpose processors (e.g., INTEL microprocessors) and/or one or more special purpose processors (e.g., digital signal processors). The CPU 202 may be configured to execute computer-readable program instructions, such as program instructions to carry out any of the functions described in this description.

The memory 204 includes a computer readable medium including volatile and/or non-volatile storage components, such as optical, magnetic, organic or other memory or disc storage, which may be integrated in whole or in part with a processor, such as CPU 202. Alternatively, the memory may be remotely located and coupled to the CPU 202 by connection mechanism and/or network cable. The memory 204 is enabled to store various types of data. For instance, the memory 204 may store one or more identifiers related to the electronic device 104 and computer-readable program instructions executable by the CPU 202. In an aspect, the memory 204 may store the video that needs to be analysed. In another aspect, the memory 204 may be configured to store one or more parameters for ghost detection. The memory 204 also includes one or more programming modules that comprise one or more instructions executable by the CPU 202. The memory 204 may comprise one or more modules, such as an field separation and overlay module 206, an inter-field average of absolute difference (AAD) calculation module 208, a first multiplexer 210, a noise reduction module 212, a edge detection module 214, a gradient extraction module 216, a significant gradient extraction module 216a, a principal gradient extraction module 216b, a difference gradient extraction module 216c, a spurious gradient removal module 216d, a boundary neighbourhood generation module 218, a nearest neighbourhood analysis module 220, a boundary thickness determination module 222, an autocorrelation analysis module 224, a combness checking module 226, equi-distant local maxima checking module 228, a second multiplexer 230, and/or a ghost confidence generation module 232.

A person of ordinary skill in the art will appreciate that each of the modules of the diagram 200 may comprise one or more instruction sets that may be stored in the memory 204 associated with the electronic device 104. The foregoing one or more stored modules may be controlled by a central processing unit 202 to perform the steps to implement the method to detect an artefact.

In an aspect, the CPU 202 may be configured to determine a mode of ghosting artefact detection based on one or more user inputs. The mode may correspond to a first mode and a second mode. The first mode may correspond to detection of inter-field ghosting associated in the image and the second mode may correspond to detection of analog ghosting. Based on the determined mode, the CPU 202 may be configured to execute one or more instructions of the field separation and overlay module 206 to split the image 108 into a plurality of fields that comprise one or more top fields and one or more bottom fields. Based on the plurality of fields, the CPU 202 may be further configured to execute one or more instructions of the field separation and overlay module 206 to generate a field overlay image. The CPU 202 may be further configured to update the image 108a based on the generated field overlay image, by execution of the one or more instructions of the first multiplexer 210. The CPU 202 may be further configured to compute an inter-field average of absolute difference (AAD) between the determined plurality of fields, based on execution of the one or more instructions of the inter-field AAD calculation module 208.

In an aspect, the image CPU 202 may be configured to pre-process the updated image 108a based on execution of one or more instructions of the noise reduction module 212. The CPU 202 may be further configured to perform edge detection on the updated and pre-processed image 108a, by execution of one or more instructions of the edge detection module 214. The one or more instructions of the edge detection module 214 may correspond to determination of a first order differential of the image 108a, a Sobel Filter based technique for edge detection, Gabor filter, and/or the like.

In an aspect, regardless of whether the determined mode of ghosting artefact detection corresponds to the first mode or the second mode, the CPU 202 may be configured to determine an edge image. Such an edge image may be determined based on extraction of gradient magnitude and the gradient angle that corresponds to pixels of the pre-processed image 108a. The edge image may be generated based on the execution of one or more instructions of the edge detection module 214, by the CPU 202. The CPU 202 may be further configured to extract a first value and a second value from the gradient magnitude. In an aspect, the first value may correspond to a first predefined percentage of a maximum gradient magnitude, and the second value may correspond to a second predefined percentage of a maximum gradient magnitude. The maximum gradient magnitude corresponds to a value associated with each of one or more rows of the image.

In an aspect, CPU 202 may be configured to process the edge image in a row-by-row pattern. For each row of the edge image, CPU 202 may be configured to determine a maximum absolute gradient magnitude. In an aspect, the CPU 202 may be configured to determine a significant gradient threshold that may be a first predefined percentage of the (above mentioned) maximum absolute gradient magnitude determined for a row of the significant edge image. The CPU 202 may be configured to compare the absolute gradient magnitudes in a row with the determined significant gradient threshold. Based on the comparison, the CPU 202 may be configured to remove the absolute gradient magnitudes that are less than the determined significant gradient threshold for the row. Further, CPU 202 may be configured to retain the absolute gradient magnitudes of a row that are greater than the determined significant gradient threshold. The CPU 202 may be configured to determine a significant edge (SE) image determined based on the aforementioned dynamic thresholding. Furthermore, the CPU 202 may perform the aforementioned determination of significant edge image for horizontal gradients. In an aspect, CPU 202 may perform the aforementioned determination of significant edge image for vertical gradients based on a transpose of the edge image. The determination of the significant edge image may be based on the execution of one or more instructions of the significant gradient extraction module 216a, by the CPU 202.

In an aspect, the CPU 202 may be configured to remove the spurious noise gradients that correspond to noise present in the generated significant edge image. In an example embodiment, the removal of the spurious noise gradients may be based on filtering technique that include, but are not limited to, median filtering technique. The removal of the spurious noise gradients may be based on execution of one or more instructions of the spurious gradient removal module 216d. Such an execution of the one or more instructions of the spurious gradient removal module 216d generates a noise reduced significant edge image. A person of ordinary skill in the art will appreciate that removal of spurious noise gradients results in non-removal of spatially aligned gradients that correspond to ghosting artefacts.

In an aspect, the CPU 202 may be configured to generate a principal edge image based on a comparison of each of the one or more gradient magnitudes that correspond to a row of the one or more rows of pixels, with the extracted second predefined percentage of a maximum gradient magnitude of the row. The generation of the principal edge image may be based on the execution of one or more instructions of the principal gradient extraction module 216b. The extracted second predefined percentage of a maximum gradient magnitude, for each row of the one or more rows of pixels of the image 108a, corresponds to a multiple of maximum boundary gradient magnitude of the row.

In an aspect, the CPU 202 may be configured to extract boundary neighbourhood information based on the principal edge image. The boundary neighbourhood information corresponds to a set of boundary neighbourhoods around the principal edges within which the ghosting artefacts are to be determined. The extraction of the boundary neighbourhood information may be based on execution of one or more instructions of the boundary neighbourhood generation module 218. In an aspect, the extraction of the boundary neighbourhood information may be based on determination of whether a pixel at a location in the principal edge image corresponds to the boundary of the principal edge image, and the pixels present in an immediate vicinity of the boundary of the principal edge image based on a first programmable parameter. Further, the extraction of the boundary neighbourhood information may be based on determination of whether a pixel at a location in the principal edge image corresponds to the boundary of the principal edge image, and the pixels present in an extended vicinity of the boundary of the principal edge image based on a second programmable parameter.

The CPU 202 may be configured to generate a delta gradient image based on a processing of the determined edge image. In an aspect, the CPU 202 may be configured to extract an intermediate image may be using a first predefined percentage of a maximum gradient magnitude in a manner similar to the significant edge image. Concurrently, the CPU 202 may be further configured to subtract each intermediate image pixel from a co-located edge image pixel to generate a raw delta gradient. Each raw delta gradient is then compared with a threshold that may be a proportional to the aforementioned first predefined percentage of a maximum gradient magnitude of a row. In scenarios when the difference exceeds the row based threshold, the pixel is assigned to the co-located delta gradient pixel. The generation of the delta gradient image may be based on the execution of one or more instructions of the difference gradient extraction module 216c.

In an aspect, the CPU 202 may be configured to determine a first count of pixels and a second count of pixels based on a spatial alignment of one or more pixels that correspond to the ghosting artefact associated with the image 108a. The first count and the second counts of pixels may be determined based on execution of one or more instructions of the nearest neighbourhood analysis module 220. The determined first count of pixels corresponds to one or more pixels associated with the ghosting artefact in the neighbourhood of the boundary in the image 108a. The determined second count of pixels corresponds to one or more pixels associated with the ghosting artefact in the extended neighbourhood of a boundary in the image 108a. The neighbourhood may be determined by CPU 202 based on execution of one or more instructions of the boundary neighbourhood generation module 218. The first count and the second count of pixels may be determined based on a spatial alignment of one or more pixels that correspond to the ghosting artefact associated with the object 110.

In an aspect, the spatial alignment of the one or more pixels may be determined based on an execution of the one or more instructions of the nearest neighbourhood analysis module 220 by the CPU 202. Further, the spatial alignment is based on the determined gradient angle and a comparison of the difference of a gradient of a pixel with the gradient of a reference pixel present at locations corresponding to non-zero pixels in the delta gradient image. In an example embodiment, the CPU 202 may be further configured to determine a third count of boundary pixels in the generated principal edge image based on the execution of one or more instructions of the boundary thickness determination module 222. The CPU 202 may be further configured to perform a row-wise autocorrelation of the one or more gradients of the noise reduced significant edge image to determine an autocorrelation profile associated with each of the one or more pixels of the generated significant edge image. The row-wise autocorrelation may be performed based on the execution of the one or more instructions of the autocorrelation analysis module 224.

In an aspect, the CPU 202 may be configured to determine a presence of convexity and a presence of combness of each of the determined autocorrelation profile associated with each of one or more rows of pixels of the generated noise reduced version significant edge image. The presence of convexity and the presence of combness may be determined based on execution of one or more instructions of the combness checking module 226. In an aspect, the presence of combness is determined based on determination of local maximas present in the determined autocorrelation profile associated with each row of the generated significant edge image. The magnitude of the determined local maximas is compared with a combness threshold to determine significant local maximas. Further, a count of determined significant local maximas which are equi-distant is determined by the electronic device 104, based on a computation of a second order difference between successive significant local maximas. The determined count of equi-distant significant local maximas may be compared with a programmable combness threshold to determine the presence of combness in the determined autocorrelation profile.

Based on the determined presence of convexity and the presence of combness, the CPU 202 may be further configured to determine a count of rows of each of one or more rows of pixels of the noise reduced significant edge image that correspond to the ghosting artefact associated in the image 108a. The foregoing count of rows may be determined based on execution of one or more instructions of the equi-distant local maxima checking module 228.

In an aspect, the CPU 202 may be configured to compute a confidence score based on at least the computed inter-field average of absolute difference (AAD), the determined first count of pixels and the second count of pixels, the determined third count of pixels, and the determined count of rows of the generated noise reduced significant edge image that correspond to the ghosting artefact in the image 108a. The CPU 202 may be configured to compute the confidence score when the third count of pixels is non-zero. Further, the computed confidence score corresponds to a non-zero value when the determined first count of pixels is non-zero and the determined first count of pixels is greater than the determined the second count of pixels. The computation of confidence score may be based on execution of one or more instructions of the ghost confidence generation module 232.

The computed confidence score may be based on one or more of pre-defined parameters that may be provided to the CPU 202 by the user (not shown). The computed confidence score is indicative of a likelihood of occurrence of the ghosting artefact in the image 108a.

Figure 3A:
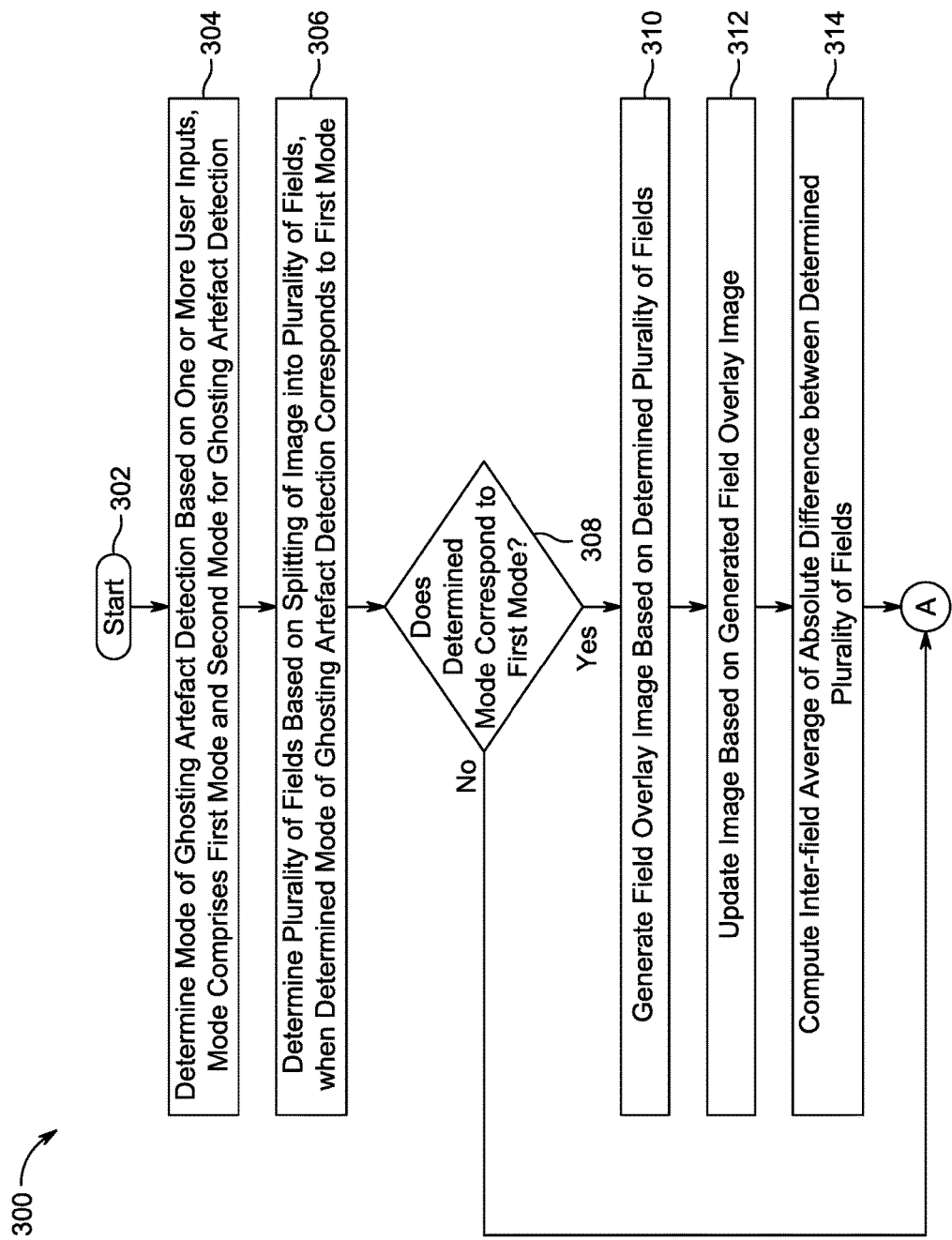
FIGS. 3A to 3C are flowcharts illustrating a method for ghost detection, according to an embodiment.
Figure 3B:
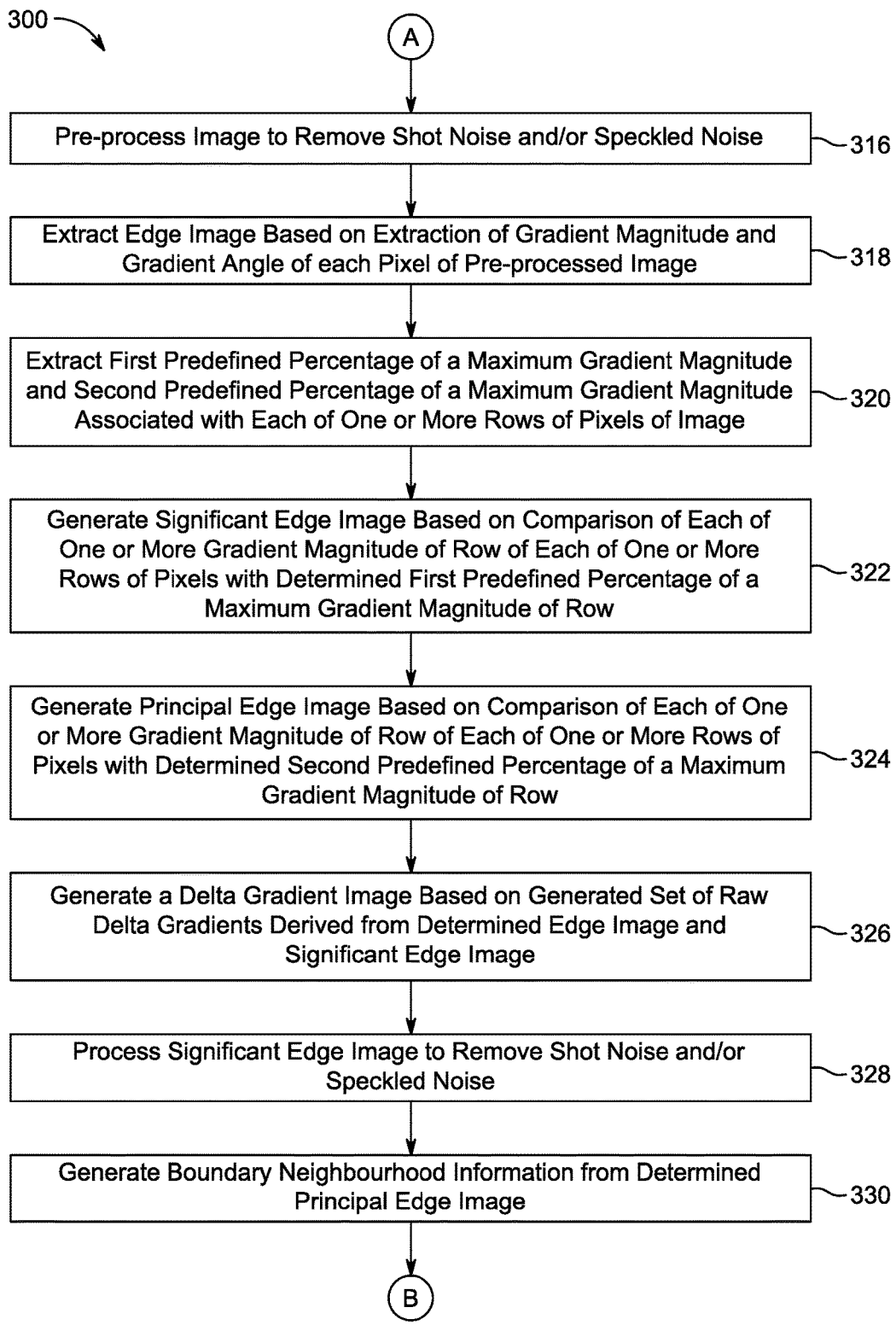
Figure 3C:
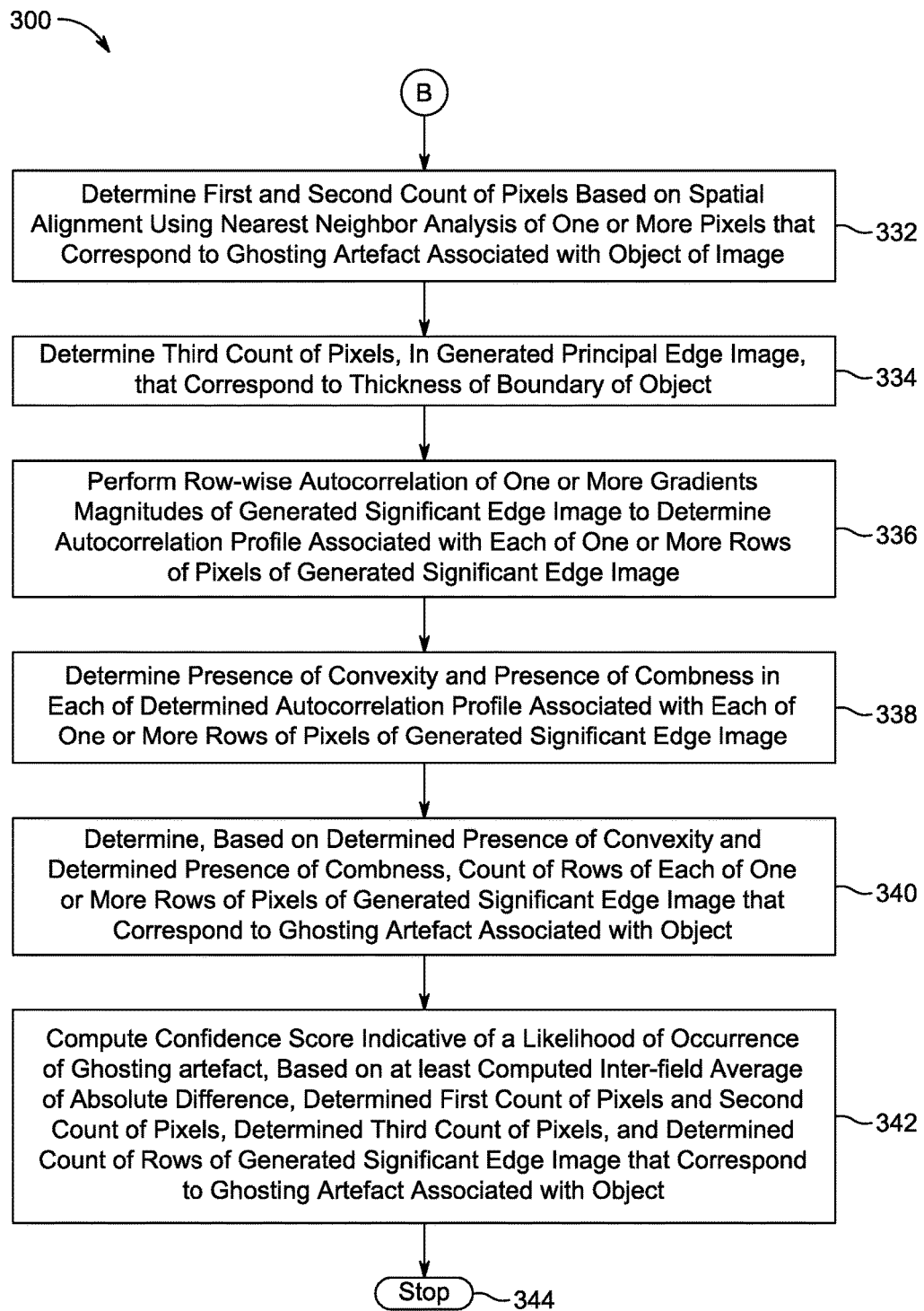

FIGS. 3A to 3C are flowcharts collectively illustrating a method for ghost detection, according to an embodiment. FIGS. 3A to 3C comprise a flowchart 300 that is explained in conjunction with the elements disclosed in FIGS. 1, 2, and 4.

The flowchart 300 starts at step 302 and proceeds to step 304. At step 304, a mode of ghosting artefact detection based on one or more user inputs may be determined by the CPU 202. The mode may comprise a first mode and a second mode for ghosting artefact detection. The first mode may correspond to detection of an inter-field ghosting artefact in the image 108a, and the second mode may correspond to detection of an analog ghosting artefact in the image 108a. The image 108a may correspond to the video received from the video source 102 (as explained in FIG. 1). In an instance, the image 108a represents the luminance (Y) component of the original input image and may be denoted as, "Y_image_array_cur".

At step 306, a plurality of fields may be determined by the CPU 202 based on a splitting of the image 108a into a plurality of fields. Such a splitting may be performed when the determined mode of ghosting artefact detection corresponds to the first mode. The determined plurality of fields may comprise one or more top fields, such as "Y_top_field", and one or more bottom fields, such as "Y_bot_field".

At step 308, it may be determined whether the determined mode corresponds to the first mode. In instances, when the determined whether the determined mode corresponds to the first mode, the control passes to step 310. In instances, when the determined whether the determined mode does not correspond to the first mode, the control passes to step 316.

At step 310, a field overlay image may be generated by the CPU 202. To generate the field overlay image, the CPU 202 may be configured to process the image 108a in a row-wise manner. Further, the field overlay image array may be generated based on a row wise absolute difference of one or more top fields, such as the "Y_top_field" and the one or more bottom fields, such as "Y_bot_field", in accordance with the equation (1), where (x, y) is the pixel location within the overlay image:

$$Y\_image\_array\_cur[x][y]=abs(Y\_top\_field[x][y]-Y\_bot\_field[x][y]) \quad (1)$$

where, the updated input image "Y_image_array_cur" corresponds to the field overlay image. This is because, for each column of each of the rows of the image 108a, the original input image "Y_image_array_cur" may be updated with a field overlay array. Further, the CPU 202 may be configured to determine an inter-field AAD denoted by "inter_field_aad", based on the field overlay image, in accordance with the equation (2):

$$inter\_field\_aad=inter\_field\_aad+Y\_image\_array\_cur[x][y] \quad (2)$$

The computed inter-field AAD may be normalized by the CPU 202 based on the dimensions of the original input image that comprise a height "h" and a width "w", in accordance with the equation (3):

$$inter\_field\_aad=inter\_field\_aad/(h*w) \quad (3)$$

At step 312, the original input image 108a may be updated based on the generated field overlay image, by the CPU 202. At step 314, an inter-field average of absolute difference (AAD), without motion compensation, may be computed by the CPU 202. The inter-field AAD may be computed between the one or more top fields, "Y_top_field", and one or more bottom fields, "Y_bot_field".

At step 316, the CPU 202 may be configured to pre-process the image 108a to remove shot and/or speckled noise associated with the image 108a. The pre-processing may be based on an image processing technique, such as median filtering. The CPU 202 may be configured to perform the median filtering based on execution of one or more instruction of the noise reduction module 212. The one or more instructions of the noise reduction module 212 may isolate a "noise pixel" in the image 108a that may be surrounded by a "normal pixel" in the vicinity of the "noise pixel". The "noise pixel" corresponds to a pixel value that may not be in consonance with one or more pixels in the vicinity. Therefore, a nearest-neighbourhood (NN) analysis may performed by constructing an "N×N" window (where "N" is typically odd). The window is moved over the "Y" (luminance component) image, one pixel location at a time—horizontally, beginning from the upper left hand corner of the image 108a, all the way to the lower right hand corner, in a raster fashion. At each location the center of the "N×N" window may be the reference pixel that is analyzed for noise. The contents of the "N×N" pixels captured within the window may be ranked from a lowest to a highest in a linear array of length "N*N". Subsequently, the reference pixel value may be replaced by the value in median location of the linear array, such as location "(N*N−1)/2". Thus, if the reference pixel is noisy, then it would be ranked very high in the linear array and thus would be far away or isolated from the median location. This step generates a "filtered_image_array".

At step 318, an edge image that corresponds to the pixels of the image 108a may be generated by the CPU 202. In an aspect, the generation of the edge image may be based on execution of one or more instructions of the edge detection module 214 by the CPU 202. The one or more instructions may be based on one or more edge detection techniques (known in the art), such as a Sobel operator, a first order difference, Canny edge detection, and/or the like.

In an aspect, the Sobel operator based technique, may be based on the implementation of masks, such as "sobel_mask_h" and "sobel_mask_v" that may be correspond a "3×3 matrix" in accordance with the equations (4) and (5):

$$\text{sobel\_mask\_h} = \begin{bmatrix} -1 & 0 & 1 \\ -2 & 0 & 2 \\ -1 & 0 & 1 \end{bmatrix} \quad (4)$$

$$\text{sobel\_mask\_v} = \begin{bmatrix} 1 & 2 & 1 \\ 0 & 0 & 0 \\ -1 & -2 & -1 \end{bmatrix} \quad (5)$$

Based on the masking of the "filtered_image_array" by use of the sobel mask "sobel_mask_h" in a raster fashion, a horizontal gradient profile may be generated. Similarly, based on the masking of the "filtered_image_array" by use of the sobel mask "sobel_mask_v" in a raster fashion, a vertical gradient profile may be generated. At each location a pair of horizontal and vertical gradient magnitudes "{grad_x, grad_y}", respectively, may be used to generate an overall gradient magnitude "uc_grad_image_array" and direction "uc_grad_angle_array", in accordance with the equations (6) and (7):

$$uc\_grad\_image\_array = \sqrt{(grad\_x)^2 + (grad\_y)^2} \quad (6)$$

$$uc\_grad\_angle\_array = \arctan(grad\_y/grad\_x) \quad (7)$$

The first order difference based technique, may be based on the implementation of masks, such as "first_diff_h" and "first_diff_v", in accordance with the equations (8) and (9):

$$\text{first\_diff\_h} = [-1 \ 1] \quad (8)$$

$$\text{first\_diff\_v} = \begin{bmatrix} -1 \\ 1 \end{bmatrix} \quad (9)$$

At step 320, a first predefined percentage of a maximum gradient magnitude and a second predefined percentage of a maximum gradient magnitude associated with each of the one or more rows of pixels of the image 108a may be extracted, by the CPU 202. The extraction of the first predefined percentage of a maximum gradient magnitude by the CPU 202 may be based on the one or more instructions of the significant gradient extraction module 216a. Similarly, the extraction of the second predefined percentage of a maximum gradient magnitude by the CPU 202 may be based on the one or more instructions of the principal gradient extraction module 216b. The extraction of the first predefined percentage of a maximum gradient magnitude and the second predefined percentage of a maximum gradient magnitude may be performed to separate or core out the noisy gradients from pixels that correspond to an object present in the image 108a or the pixels that correspond to the ghosting artefact.

In an aspect, a max gradient "max_grad" for each row may be obtained by the CPU 202 by use of the pair of horizontal and vertical gradient magnitudes "{grad_x, grad_y}". Further, the maximum value obtained for each row of the image 108a may be used to implement a first predefined percentage of a maximum gradient magnitude "GRAD_CORE[x]" for that row, where "x" is the row index. In an aspect, a proportion of the "max_grad" may be used to generate the first predefined percentage of a maximum gradient magnitude "GRAD_CORE[x]" in accordance with equation (10):

$$\text{GRAD\_CORE}[x] = \text{max\_grad}/EB\_K1 \quad (10)$$

where, "EB_K1" is a predefined constant that corresponds to a set of predefined constants stored in the memory 204. Similarly, the maximum value obtained for each row of the image 108a may be used to implement a second predefined percentage of a maximum gradient magnitude "BOUNDARY_CORE[x]" for that row, where "x" is the row index. In an aspect, a proportion of the "max_grad" may be used to generate the second predefined percentage of a maximum gradient magnitude "BOUNDARY_CORE[x]" in accordance with equation (11):

$$\text{BOUNDARY\_CORE}[x] = B\_SCALE*(\text{max\_grad}/EB\_K1) \quad (11)$$

where, "EB_K1" is the predefined constant that corresponds to the set of predefined constants and "B_SCALE" is the scaling factor. A person of ordinary skill in the art will appreciate that the predefined constant "EB_K1" and the scaling factor "B_SCALE" may be stored in the memory 204 or provided by the user in real-time, without limiting the scope of the disclosure.

At step 322, a significant edge image may be generated based on a comparison of each of the one or more gradient magnitudes that correspond to a row of each of the one or more rows of pixels of the image 108a, with the first predefined percentage of a maximum gradient magnitude. For example, the overall gradient magnitude "uc_grad_image_array[x][y]" for a row index "x" and column index "y", may be compared with the first predefined percentage of a maximum gradient magnitude "GRAD_CORE[x]". In instances, when the value of the overall gradient magnitude "uc_grad_image_array[x][y]" is exceeds the first predefined percentage of a maximum gradient magnitude "GRAD_CORE[x]", an element in the array "thr_grad_image_array[x][y]" having row index "x" and column index "y" is updated with the overall gradient magnitude "uc_grad_image_array[x][y]". In instances, when the value of the overall gradient magnitude "uc_grad_image_array[x][y]" is less than the first predefined percentage of a maximum gradient magnitude "GRAD_CORE[x]", an element in the array "thr_grad_image_array[x][y]" having row index "x" and column index "y" is updated with a value "0". The array "thr_grad_image_array" corresponds to the significant edge image.

At step 324, a principal edge image may be generated based on a comparison of each of the one or more gradient magnitudes that correspond to a row of each of the one or more rows of pixels of the image 108a, with the second predefined percentage of a maximum gradient magnitude of the row. For example, the overall gradient magnitude "uc_grad_image_array[x][y]" for a row index "x" and column index "y", may be compared with the second predefined percentage of a maximum gradient magnitude "BOUNDARY_CORE[x]". In instances, when the value of the overall gradient magnitude "uc_grad_image_array[x][y]" exceeds the second predefined percentage of a maximum gradient magnitude "BOUNDARY_CORE[x]", an element in the array "boundary_image_array_[x][y]" having row index "x" and column index "y" is updated with the overall gradient magnitude "uc_grad_image_array[x][y]". In instances, when the value of the overall gradient magnitude "uc_grad_image_array[x][y]" is less than the second predefined percentage of a maximum gradient magnitude "BOUNDARY_CORE[x]", an element in the array "boundary_image_array [x][y]" having row index "x" and column index "y" is updated with a value "0". The array "boundary_image_array" corresponds to the principal edge image. In an instance, the first gradient magnitude "GRAD_CORE[x]" is lower than the second predefined percentage of a maximum gradient magnitude "BOUNDARY_CORE[x]" for boundary gradients such that the generated significant edge image may typically contain edge artefacts as well as the boundary edges, whereas the principal edge image may mostly contain the boundary edges.

At step 326, a delta gradient image may be generated by the CPU 202, based on an operation involving the determined edge image. For example, in an instance the delta gradient image may be generated based on the determined edge image array "uc_grad_image_array". Further, an intermediate image that may be extracted using the first predefined percentage of a maximum gradient magnitude in a manner similar to determination of the significant edge image. Also, each pixel, of the intermediate image pixel so generated, may be subtracted from the co-located edge image pixel to generate a raw delta gradient pixel. In an example embodiment, the significant edge image generated by the significant gradient extraction module 216a may be used for subtraction of the pixel of the significant edge image from the co-located edge image pixel to generate a raw delta gradient pixel. Each raw delta gradient pixel may be compared to a threshold that is proportional to the aforementioned first predefined percentage of a maximum gradient magnitude of a row. In an example embodiment, the threshold may be half of the aforementioned first predefined percentage of the maximum gradient magnitude of a row. If the difference exceeds this row based threshold, then it may be assigned to a co-located delta gradient pixel. The foregoing subtraction is performed by the CPU 202 based on the one or more instructions of the difference gradient extraction module 216c to generate delta gradient image denoted by "delta_grad_image_array".

At step 328, the significant edge image may be processed by the spurious gradient removal module 216d to remove to remove shot and/or speckled noise associated with the significant edge image. The processing may be based on an image processing technique, such as median filtering. At step 330, boundary neighbourhood information may be generated by the CPU 202 based on the generated principal edge image. The generation of the boundary neighbourhood information may be based on execution of one or more instructions of the boundary neighbourhood information generation module 218. In an aspect, the boundary neighbourhood information may correspond to a set of boundary neighbourhood pixels around the principal edges. The ghosting artefacts are to be determined within these set of boundary. The boundary neighbourhood information may comprise generation of a boundary neighbourhood image, "boundary_image_array" that corresponds to neighbourhood of boundaries in principal edge image. In order to determine the boundary neighbourhood image and the boundary neighbourhood information, the CPU 202 may be configured to retrieve the programmable parameters, such as "BOUNDARY_NHBD_LEN_N", "BOUNDARY_NHBD_LEN_E", "NN_LENGTH", and "NN_THR", from the memory 204.

In an aspect, the CPU 202 may be configured to determine a near boundary neighbourhood image. Such a determination may be based on processing the "boundary_image_array" in a raster fashion wherein the pixels of the "boundary_image_array" are processed from the upper left hand corner (top row of the pixels) to the lower right hand corner (bottom row of the pixels). In an example embodiment, the near boundary neighbourhood image may be represented by "boundary_near_nhbd_image_array". The CPU 202 may be configured to determine whether a pixel at a location "(x, y)" corresponds to an edge pixel of the principal edge image. Further, using the programmable parameters, such as "BOUNDARY_NHBD_LEN_N" and "BOUNDARY_NHBD_LEN_N+1" that may be stored in the memory 204, the CPU 202 may be configured to check whether a pixel at a location "(i, j)" of the "boundary_image_array", corresponds to the boundary pixels in the immediate vicinity of the principal edge. For each pixel in the immediate vicinity of the principal edge, the CPU 202 may be configured to check whether a pixel corresponds to the boundary pixels of the boundary edges. In instances, when the pixels do not correspond to boundary pixels, the CPU 202 may be configured to update the pixels at the location "(i, j)" of the near boundary neighbourhood image "boundary_near_nhbd_image_array" with a value "1".

Similarly, the CPU 202 may be configured to determine an extended boundary neighbourhood image represented by "boundary_extended_nhbd_image_array". Such a determination may be based on processing the "boundary_image_array" in a raster fashion wherein the pixels of the "boundary_image_array" are processed from the upper left hand corner (top row of the pixels) to the lower right hand corner (bottom row of the pixels). The CPU 202 may be configured to determine whether a pixel at a location "(x, y)" corresponds to a pixel of the principal edge image. Further, using the programmable parameters, such as "BOUNDARY_NHBD_LEN_E" and "BOUNDARY_NHBD_LEN_E+1" that may be stored in the memory 204, the CPU 202 may be configured to check whether a pixel at a location "(i, j)" of the "boundary_image_array", corresponds to the boundary pixels in the extended vicinity of the principal edge. For each pixel in the extended vicinity of the principal edge, the CPU 202 may be configured to check whether a pixel corresponds to the boundary pixels of the boundary edges. In instances, when the pixels does not correspond to boundary pixels, the CPU 202 may be configured to update the pixels at the location "(i, j)" of the extended boundary neighbourhood image "boundary_extended_nhbd_image_array" with a value "1".

At step 332, a first count of pixels, such as "delta_grad_eroded_pixel_count_1" and a second count of pixels, such as "delta_grad_eroded_pixel_count_2" may be determined by the CPU 202, based on a spatial alignment of the one or more pixels that correspond to ghosting artefact in the generated delta gradient image. The determination of the first count of pixels and the second count of pixels may be further based on the gradient angle information in the form of the "uc_grad_angle_array" (equation (7)) determined by the edge detection module 214. The first count of pixels corresponds to one or more pixels associated with the ghosting artefact in neighbourhood of boundary (first secondary boundary 112b) present in the image. The second count of pixels corresponds to one or more pixels associated with the ghosting artefact in extended neighbourhood (spatially aligned second secondary edge 112c) of the boundary (first secondary boundary 112b) present in the image. The foregoing determination may be performed by the CPU 202 based on the one or more instructions of the nearest neighbourhood analysis module 220. The one or more instructions of the nearest neighbourhood analysis module 220 may be based on a nearest neighbourhood analysis technique (known in the art), to remove spurious noise gradients around the principal edges present in the image 108a while preserving spatially aligned gradients that correspond to the ghosting artefact.

To determine the first count of pixels and the second count of pixels, the CPU 202 may be configured to process the delta gradient image in a raster fashion wherein the pixels of the delta gradient image are processed from the upper left hand corner (top row of the pixels) to the lower right hand corner (bottom row of the pixels) of the delta gradient image. The CPU 202 may further initialize a counter "ghost_pixel_count", for the aforementioned determination of the first count of pixels and the second count of pixels. The counter "ghost_pixel_count" corresponds to a count of the number of ghost artefact gradient pixels in the region beyond the immediate neighbourhood of the boundary (denoted by a square region of dimension "NN_LENGTH*NN_LENGTH", around each boundary pixel (x, y)), but within an extended neighbourhood of the boundary. For example, the CPU 202 may, for each row of pixels "x", process each column "y". The processing of the pixel at a location "(x, y)" may correspond to an erosion analysis that may be performed on the pixel, based on pixels in a neighbourhood at a location "(i, j)" with respect to the location "(x, y)". The number of pixels in the neighbourhood of the location "(x, y)" may be represented by a "(NN_LENGTH*NN_LENGTH)" window. For each neighbouring pixel at the location "(i, j)", the CPU 202 may further determine if the gradient angles of the neighbouring pixel (denoted by "uc_grad_angle_array[i][j]") is spatially aligned with the gradient angle of the pixel at the location "(x, y)" (denoted by "uc_grad_angle_array[x][y]"). Such a determination of the spatial alignment of the gradient angles may be based on an angle threshold value "EB_ANG_THR" and a temporary counter "temp" that may be stored in the memory 204. Based on the foregoing determination, the CPU 202 may be configured to update a counter (such as "temp") that may be used for tracking a count of each gradient point "(i, j)" in the "delta_grad_array" that is spatially aligned with a reference gradient point "(x, y)". The CPU 202 may be configured to compare a determined absolute difference in the gradient angles of the pixel at the reference gradient point "(x, y)" and the neighbourhood gradient point "(i, j)" with the angle threshold value "EB_ANG_THR", in accordance with the equation (12):

$$\text{abs}(uc\_angle\_image\_array[x][y] - uc\_angle\_image\_array[i][j]) < EB\_ANG\_THR \quad (12)$$

In instances, when the aforementioned condition is true, the CPU 202 may be configured to increment the counter "temp" by a count of "1". Such an increment may be indicative of the fact that the gradient angles of the neighbouring pixel (denoted by "uc_grad_angle_array[i][j]") is spatially aligned with the gradient angle of the pixel at the location "(x, y)" (denoted by "uc_grad_angle_array[x][y]").

In an instance, the CPU 202 may be configured to determine whether the value of the counter "temp" is greater than the programmable threshold "NN_THR". Further, the CPU 202 may be further configured to determine whether the pixel corresponds to the near boundary neighbourhood image "boundary_near_nhbd_image_array". Based on the aforementioned determination, the CPU 202 may be configured to update the first count of pixels "delta_grad_eroded_pixel_count_1". Such first count of pixels corresponds to a count of pixels affected by ringing artifact.

Similarly, CPU 202 may be configured to determine whether the value of the counter "temp" is greater than the programmable threshold "NN_THR". Further, the CPU 202 may be further configured to determine whether the pixels are located in an extended neighbourhood and correspond to the extended boundary neighbourhood image "boundary_extended_nhbd_image_array". Based on the aforementioned determination, the CPU 202 may be configured to determine a denoised (eroded) gradient image "delta_grad_eroded_image_array[x][y]". The CPU 202 may be further configured to update a denoised gradient statistic "delta_grad_eroded_image_agg_2" based on the aggregate of determined denoised gradient image. The CPU 202 may be further configured to update the second count of pixels "delta_grad_eroded_pixel_count_2". Such second count of pixels corresponds to a count of pixels affected by ghosting artifact.

In an aspect, based on the subtraction of the updated first count of pixels from the updated second count of pixels, the CPU 202 may be configured to update the counter "ghost_pixel_count".

At step 334, a third count of pixels, in generated principal edge image, that correspond to boundary thickness of an object, such as the object 110, present in the image 108a, may be determined by the CPU 202 based on the execution of one or more instructions of the boundary thickness determination module 222. In an instance, the boundary thickness of the object 110 may be denoted by a value "overall_av_boundary_thickness". In an instance, the CPU 202 may be configured to determine the boundary thickness "overall_av_boundary_thickness", of the object 110 based on a processing of each pixel "boundary_image_array" of the principal edge image. In an aspect, the CPU 202 may be configured to start a counter "iter" in order to determine the boundary thickness of the object 110. The counter "iter" may comprise value "0" corresponding to horizontal processing and value "1" corresponding to vertical processing. With the value of the counter "iter" set as "0", the CPU 202 may further initialize a variable "boundary_pixel_count" and "boundary_h_seg_count" with a value "0" for tracking the thickness of the boundary of the object 110. Based on a comparison of the each pixel of overall gradient magnitude image "uc_grad_image_array[x][y]" with the second predefined percentage of a maximum gradient magnitude "BOUNDARY_CORE[x]", the CPU 202 may increment the variable "boundary_pixel_count", when the overall gradient magnitude image "uc_grad_image_array[x][y]" is greater than the second predefined percentage of a maximum gradient magnitude "BOUNDARY_CORE[x]".

In an aspect, the CPU 202 may be further configured to increment the value of the "boundary_h_seg_count" by "1" whenever a pixel of the principal edge image "boundary_image_array" is encountered, such that the value of the pixel preceding the current pixel corresponds to the boundary of the image, and the value of the current pixel is zero. This is in accordance with the condition disclosed in the equation (13):

$$if, ((boundary\_image\_array[x][y-1]>0) \text{ and } (boundary\_image\_array[x][y]=0)) \quad (13)$$

The CPU 202 may be further configured to determine an average boundary thickness "av_boundary_thickness" of the boundary of the object 110 in horizontal direction. Similarly, with the value of the counter "iter" set as "1", the CPU 202 may perform each of the aforementioned steps to determine the average boundary thickness "av_boundary_thickness" of the boundary of the object 110 in vertical direction. The average boundary thickness "av_boundary_thickness" of the boundary of the object 110 in a given direction is determined in accordance with the equation (14):

$$av\_boundary\_thickness[iter] = boundary\_pixel\_count/boundary\_h\_seg\_count \quad (14)$$

where, "boundary_h_seg_count" corresponds to the count of the horizontal segments of the boundary of the object 110 (count of the vertical segments in case of "iter" having value set as "1"). The CPU 202 may be further configured to determine the boundary thickness "overall_av_boundary thickness" based on the equation (15):

$$overall\_av\_boundary\_thickness = (av\_boundary\_thickness[0] + av\_boundary\_thickness[1])/2 \quad (15)$$

where, "av_boundary_thickness[0]" corresponds to average boundary thickness in horizontal direction, and "av_boundary_thickness[1]" corresponds to average boundary thickness in vertical direction.

Figure 4:
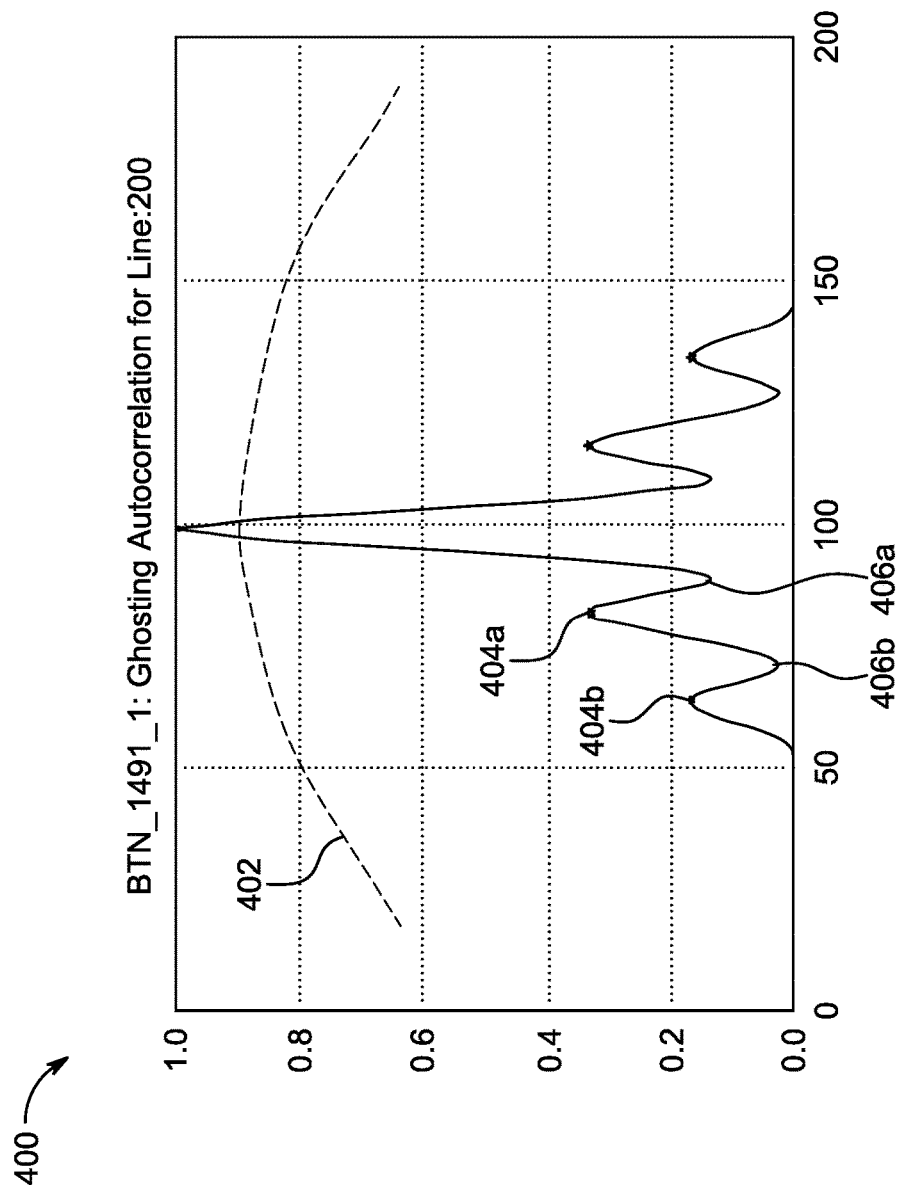
FIG. 4 is a graph illustrating an autocorrelation profile based on a row-wise autocorrelation performed on a noise reduced significant edge image, according to an embodiment.

At step 336, a row-wise autocorrelation of one or more gradients of a noise reduced version of the generated significant edge image may be performed by the CPU 202 to determine autocorrelation profile associated with each of one or more rows of pixels of generated significant edge image. The noise reduction may be performed by the spurious gradient removal module 216d. The row-wise autocorrelation may be performed by the CPU 202 based on execution of one or more instructions of the autocorrelation analysis module 224. In an instance, the row-wise autocorrelation may be performed to validate the presence of the ghost reflections, which are typically equally spaced and occur along the width of an image, such as the image 108a. The CPU 202 may be configured to perform the row-wise autocorrelation on the noise reduced "thr_grad_image_array" on a per row basis. In an instance, the CPU 202 may be configured to consider the gradients at a location within the ghosting neighbourhood. The CPU 202 may be further configured to perform a median filtering on the aforementioned (gradient) row to remove noise gradients, and determine the corresponding a row "grad_image_array_e". The CPU 202 may be further configured to compute the autocorrelation profile "h_corr" of the extracted row of "grad_image_array_e". The computed autocorrelation profile "h_con" as a result of autocorrelation of the "grad_image_array_e" is depicted in FIG. 4. A person of ordinary skill in the art will appreciate that the autocorrelation profile "h_con" of the extracted row of "grad_image_array_e" comprises determining autocorrelation based on the algorithms known in the art, without limiting the scope of the disclosure.

At step 338, a presence of convexity, a presence of combness, count of rows of each of one or more rows of pixels of generated significant edge image that correspond to ghosting artefact associated with object 110, may be determined by the CPU 202. The presence of convexity and the presence of combness may be performed based on execution of one or more instructions of the combness checking module 226.

In addition to the foregoing, the CPU 202 may be further configured to perform an equi-distant check on the successive crests (maximas) of the autocorrelation profile. The equi-distant check may be performed based on execution of one or more instructions of the equi-distant local maxima checking module 228.

In an instance, the presence of convexity may correspond to a convexity 402 of the computed autocorrelation profile "h_corr" (depicted as autocorrelation profile 400 in FIG. 4). Further, the presence of combness is based on the crests and troughs of an autocorrelation profile of the significant edge image. As is evident, the autocorrelation profile 400 comprises well defined crests 404a and 404b, and well defined troughs 406a and 406b, that provides a comb-like appearance to the autocorrelation profile 400, the determined presence of combness of the autocorrelation profile 400 will be high. The CPU 202 may be configured to perform convexity check for the autocorrelation profile based on the location of the crests, such as 404a and 404b, in the autocorrelation profile 400. Based on the aforementioned convexity check, the CPU 202 may be configured to determine the presence of convexity in the autocorrelation profile 400.

To determine the presence of combness, the CPU 202 may be configured to set the "ghosting_row_count" parameter to '0'. The "ghosting_row_count" corresponds to a number of rows "grad_image_array_e" of the significant edge image for which the autocorrelation profile 400 indicate the presence of ghost reflections. In an aspect, CPU 202 may be configured to determine the crests in the autocorrelation profile 400 based on the conditions disclosed in the equations (16) and (17):

$$((((h\_corr[n+1] - h\_corr[n] > 0) \text{ and } (h\_corr[n+2] - h\_corr[n+1] < 0)) \quad (16)$$

or $$((h\_corr[n+1] - h\_corr[n] < 0) \text{ and } (h\_corr[n+2] - h\_corr[n+1] > 0)))) \quad (17)$$

In an aspect, the CPU 202 may be configured to store these crest locations in array comb_index in memory 204. The CPU 202 may be configured to detect the "significant" crests (local maxima), such as 400a and 400b present in the autocorrelation profile 400. In an aspect, CPU 202 may detect the significant crest based on the conditions disclosed in the equations (18), (19), and (20).

$$((h\_corr[comb\_index[n+1]] - h\_corr[comb\_index[n]] > (1/EB\_COMB\_SCALE\_L2)) \quad (18)$$

and $$(h\_corr[comb\_index[n+2]] - h\_corr[comb\_index[n+1]] < (1/EB\_COMB\_SCALE\_L2)) \quad (19)$$

and $$(h\_corr[comb\_index[n+1]] > (1.0/EB\_COMB\_SCALE\_H2))) \quad (20)$$

where, "EB_COMB_SCALE_L2" and "EB_COMB_SCALE_H2" correspond to the set of predefined constants stored in the memory 204. The CPU 202 may be configured to store the locations of significant crests in an array "crest_location" that may be stored in the memory 204.

The CPU 202 may be further configured to track the significant crests (local maxima), such as 400a and 400b present in the autocorrelation profile 400. Such a tracking of the significant crests (local maxima) may be based on incrementing of a counter "crest_comb_count" by the CPU 202, each time a significant crest (local maximum) is detected. Such a counter "crest_comb_count" may be stored in the memory 204. The CPU 202 may be further configured to determine a threshold "HALFWAY_POINT" that may correspond to the index of the central significant crest (global maximum for a convex function) of the autocorrelation profile 400. In an aspect, the CPU 202 may be configured to store the threshold "HALFWAY_POINT" in the memory 204. The CPU 202 may be further configured to calculate a second order difference between successive crests to determine whether the successive crests are approximately equi-distant. In instances, when the successive crests are approximately equi-distant, the CPU 202 may be configured to tag a first crest nearest to the central maximum, as a start of the comb-like trend. The CPU 202 may be further configured to determine whether the number of successive (approximately equi-distant) valleys is greater than a threshold "EB_NUM_OF_VALLEYS_THR". In an instance, when the number of successive (approximately equi-distant) valleys is greater than a threshold "EB_NUM_OF_VALLEYS_THR", the CPU 202 may be configured to validate the presence of the combness in the autocorrelation profile 400.

Further, the CPU 202 may be configured to determine a presence of the convexity in the autocorrelation profile 400. Such a check may be based on setting of a flag "convexity" that corresponds to presence of convexity in the autocorrelation profile 400. The flag "convexity" indicates that a valid convex autocorrelation has been evaluated for the given row of the significant edge image. The aforementioned flag may be further used to control the incrementing of the "ghosting_row_count" on a row-by-row basis. To determine presence of convexity, the CPU 202 may be configured to retrieve the counter "crest_comb_count" from the memory 204. The CPU 202 may be further configured to retrieve the predefined parameter "HALFWAY_POINT" from the memory 204. Further, for each detected significant crests (local maxima) in the autocorrelation profile 400, the CPU 202 may be configured to compare each significant crests (local maxima), such as 404b, with an adjacent significant crests (local maxima), such as 404a, in accordance with the condition mentioned in the equation (21):

$$(((h\_corr[crest\_location[n+1]]<h\_corr[crest\_location[n]]) \text{ and } (crest\_location[n+1]<=\text{HALFWAY\_POINT})) \text{ or } ((h\_corr[crest\_location[n+1]]>h\_corr[crest\_location[n]]) \text{ and } (crest\_location[n+1]>\text{HALFWAY\_POINT}))) \quad (21)$$

where, "h_corr" corresponds to the autocorrelation profile 400, disclosed above. In instances, when the aforementioned condition of the equation (21) is true, the CPU 202 may be configured to set the flag "convexity" to "1" to indicate the successful detection of the presence of convexity in the autocorrelation profile 400.

At step 340, based on the determined presence of convexity and determined the presence of combness, a count of rows "ghosting_row_count" of each of one or more rows of pixels of generated significant edge image, may be determined by the CPU 202. Such a count of rows may correspond to the presence of ghosting artefact associated with object 110 for a given row for which the "convexity" is set to "1". Thus, "ghosting_row_count" corresponds to the number of rows for which the "convexity" flag is set to a value, such as "1". The foregoing determination may be performed based on execution of one or more instructions of the second multiplexer 230.

At step 342, a confidence score may be computed by the CPU 202. The computation of the confidence score may be based on execution of one or more instructions of the ghost confidence generation module 232. The confidence score may be indicative of a likelihood of occurrence of ghosting artefact.

In an instance, to compute the confidence score, the CPU 202 may be configured to refer to the significant boundary of the object 110 and the "overall_avg_boundary_thickness" to avoid detection of the boundary of the object 110 as the ghosting artefact. The CPU 202 may be configured to compute normalized gradient aggregate in extended region in the vicinity of the boundary of the object 110, in accordance with the equation (22):

$$\text{norm\_delta\_grad\_agg}=(\text{delta\_grad\_eroded\_image\_agg\_2}/\text{boundary\_pixel\_count}) \quad (22)$$

where, "delta_grad_eroded_image_agg_2" corresponds to denoised gradient statistic that is being used to obtain the normalized gradient aggregate in the extended vicinity of the principal boundary of the image. In an instance, the CPU 202 may be further configured to determine the confidence score based on the conditions recited in the equation (23) and (24):

$$\text{delta\_grad\_eroded\_pixel\_count\_2} \neq 0 \quad (23)$$

$$\text{delta\_grad\_eroded\_pixel\_count\_2} > \text{delta\_grad\_eroded\_pixel\_count} \quad (24)$$

where, "delta_grad_eroded_pixel_count_1" corresponds to first count of pixels, and "delta_grad_eroded_pixel_count_2" corresponds to the second count of pixels. In other words, the CPU 202 may determine whether the second count of pixels "delta_grad_eroded_pixel_count_2" is non-zero and whether the second pixel value "delta_grad_eroded_pixel_count_2" is greater than the first count of pixels "delta_grad_eroded_pixel_count_1". In instances when the conditions recited in the equations (21) and (22) are not satisfied, the confidence score is determined to be zero. In instances when the conditions recited in the equations (23) and (24) are satisfied, the CPU 202 may be configured to compute a temporary variable, in accordance with the equation (25):

$$\begin{aligned}f_{temp}=&((\text{ghost\_pixel\_count}/\text{delta\_grad\_eroded\_pixel\_count\_2})*(e^{(EB\_K5*(\text{norm\_delta\_grad\_agg}))\wedge 3})*\\&(e^{(EB\_K6*(\text{boundary\_pixel\_count})\wedge EB\_K7)})*\\&(1.0-e^{(EB\_K11*}\\&(\text{overall\_av\_boundary\_thickness})\wedge EB\_K12)}))\end{aligned} \quad (25)$$

where, "ftemp" corresponds to the temporary variable, "ghost_pixel_count" corresponds to the count of pixels of ghosting artefact, "delta_grad_eroded_pixel_count_2" corresponds to the second count of pixels, "norm_delta_grad_agg" corresponds to normalized delta gradient aggregate, "boundary_pixel_count" corresponds to boundary thickness of the boundary of the object 110, "overall_av_boundary_thickness" corresponds to an average thickness of the boundary of the object 110, "EB_K5", "EB_K6", "EB_K7", "EB_K11" and "EB_K12" corresponds to a set of predefined constants stored in the memory 204. In an aspect, the set of constants may be user configurable. A person of ordinary skill in the art will appreciate that the symbol "^" used in the equation (25) refers to the exponentiation mathematical operator.

In an instance, the CPU 202 may be further configured to determine the confidence score based on the computed temporary variable, in accordance with equation (26) and (27):

$$EB\_K13 = EB\_K13/4.0 \quad (26)$$

$$\text{ghost\_pixel\_confidence} = \text{ftemp} * (1.0 - e^{(EB\_K13*(ghosting\_row\_count)^2)}) \quad (27)$$

where, "ghost_pixel_confidence" corresponds to the confidence score, the "ftemp" corresponds to the temporary variable computed in the equation (23), "EB_K13" corresponds to the set of predefined constants stored in the memory 204.

The CPU 202 may be further configured to determine whether the mode of ghosting artefact detection, based on the user input. In an instance, when the mode of ghosting artefact detection corresponds to the first mode, the CPU 202 may be configured to update the value of the temporary variable, in accordance with equation (28):

$$\text{ftemp} = (\text{ftemp})^{EB\_K69} \quad (28)$$

where, "EB_K69" corresponds to the set of predefined constants stored in the memory 204. Further, the CPU 202 may be configured to determine the updated confidence score based on the confidence score determined in equation (27), the computed inter-field AAD, in accordance with equation (29):

$$\text{ghost\_pixel\_confidence} = \text{ghost\_pixel\_confidence} * (1 - e^{(EB\_K70)*((inter\_field\_aad/EB\_K71), EB\_K72))}) \quad (29)$$

where, "ghost_pixel_confidence" corresponds to the confidence score determined in equation (27), "inter_field_aad" corresponds to the computed inter-field AAD, and "EB_K70", "EB_K71", and "EB_K72" correspond to the set of predefined constants stored in the memory 204. The control passes to the end step 344.

A person of ordinary skill in the art will appreciate that the set of predefined constants may be provided to the electronic device 104, by a user, in real-time, without limiting the scope of the disclosure FIG. 4 is a graph illustrating an autocorrelation profile based on a row-wise autocorrelation performed on a significant edge image, according to an embodiment. FIG. 4 is explained in conjunction with the elements disclosed in FIGS. 1 to 3.

With reference to the FIG. 4, there is shown an autocorrelation profile 400 of the significant edge image determined based on the input image 108a. The autocorrelation profile comprises a shape indicator 402. The autocorrelation profile 400 further comprises plurality of crests, such as 404a and 404b that correspond to local maximas. The autocorrelation profile 400 further comprises and a plurality of troughs, such a 406a and 406b that correspond to local minimas. The detailed explanation of the significance of the elements shown in FIG. 4 is provided in the description of FIGS. 3A to 3C.

Embodiments of the present disclosure may be provided as a computer program product, which may include a computer-readable medium tangibly embodying thereon instructions, which may be used to program a computer (or other electronic devices) to perform a process. The computer-readable medium may include, but is not limited to, fixed (hard) drives, magnetic tape, floppy diskettes, optical disks, compact disc read-only memories (CD-ROMs), and magneto-optical disks, semiconductor memories, such as ROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present disclosure may also be downloaded as one or more computer program products, wherein the program may be transferred from a remote computer to a requesting computer by way of data signals embodied in a carrier wave or other propagation medium via a communication link (e.g., a modem or network connection).

Other embodiments of the disclosure may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to detect ghosting artefacts in an image. The steps may comprise determining a mode of ghosting artefact detection based on one or more user inputs, the mode comprises a first mode and a second mode for ghosting artefact detection; determining a plurality of fields based on splitting of the image into the plurality of fields, when the determined mode of ghosting artefact detection corresponds to the first mode; generating a field overlay image based on the determined plurality of fields; updating the image based on the generated field overlay image; computing an inter-field average of absolute difference between the determined plurality of fields of the updated image; pre-processing the image to filter out at least speckled noise; extracting an edge image by extraction of gradient magnitude and angle of each pixel of the pre-processed image; determining a maximum absolute gradient magnitude for each row of the edge image based on the gradient magnitude of each pixel in each row of the edge image; determining a first predefined percentage and a second predefined percentage of a maximum absolute gradient magnitude associated with each of one or more rows of pixels of the image; generating a significant edge image, based on comparison of gradient magnitudes of each pixel in each of one or more rows of pixels of the significant edge image, with the determined first predefined percentage of the maximum absolute gradient magnitude of the row; generating a noise reduced significant edge image based on performing median filtering on the generated significant edge image; generating a principal edge image, based on comparison of gradient magnitudes of each pixel in each of one or more rows of pixels of the principal edge image, with the determined second predefined percentage of the maximum absolute gradient magnitude of the row; generating boundary neighbourhood information based on the generated principal edge image; generating a delta gradient image based on a processing of the determined edge image; determining a first count of pixels and a second count of pixels, in the computed delta gradient image, based on a spatial alignment of one or more pixels in the delta gradient image and the generated boundary neighbourhood information; determining a third count of pixels, in the generated principal edge image, that correspond to a thickness of a boundary of an object present in the image; performing a row-wise autocorrelation of one or more gradient magnitudes of the generated noise reduced significant edge image to determine an autocorrelation profile associated with the each of one or more rows of pixels of the generated noise reduced significant edge image; determining a presence of convexity and a presence of combness in the determined autocorrelation profile associated with the each of one or more rows of pixels of the generated noise reduced significant edge image; determining, based on the determined presence of convexity and the determined presence of combness, a count of rows of each of one or more rows of pixels of the generated noise reduced significant edge image that correspond to the ghosting artefact associated with the object; and computing a confidence score indicative of a likelihood of occurrence of the ghosting artefact associated with the object, based on at least the computed inter-field average of absolute difference, the determined first count of pixels and the second count of pixels, the determined third count of pixels, and the determined count of rows of the generated noise reduced significant edge image that correspond to the ghosting artefact associated with the object.

Moreover, although the present disclosure and its advantages have been described in detail, it should be understood that various changes, substitutions and alterations can be made herein without departing from the disclosure as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for ghost detection in an image, the method comprising:
   determining a mode of ghosting artefact detection based on one or more user inputs, the mode comprises a first mode and a second mode for ghosting artefact detection;
   determining a plurality of fields based on splitting of the image into the plurality of fields, when the determined mode of ghosting artefact detection corresponds to the first mode;
   generating a field overlay image based on the determined plurality of fields;
   updating the image based on the generated field overlay image;
   computing an inter-field average of absolute difference between the determined plurality of fields of the updated image;
   pre-processing the image to filter out at least speckled noise;
   extracting an edge image by extraction of gradient magnitude and angle of each pixel of the pre-processed image;
   determining a maximum absolute gradient magnitude for each row of the edge image based on the gradient magnitude of each pixel in each row of the edge image;
   determining a first predefined percentage and a second predefined percentage of a maximum absolute gradient magnitude associated with each of one or more rows of pixels of the image;
   generating a significant edge image, based on comparison of gradient magnitudes of each pixel in each of one or more rows of pixels of the significant edge image, with the determined first predefined percentage of the maximum absolute gradient magnitude of the row;
   generating a noise reduced significant edge image based on performing median filtering on the generated significant edge image;
   generating a principal edge image, based on comparison of gradient magnitudes of each pixel in each of one or more rows of pixels of the principal edge image, with the determined second predefined percentage of the maximum absolute gradient magnitude of the row;
   generating boundary neighbourhood information based on the generated principal edge image;
   generating a delta gradient image based on a processing of the determined edge image;
   determining a first count of pixels and a second count of pixels, in the computed delta gradient image, based on a spatial alignment of one or more pixels in the delta gradient image and the generated boundary neighbourhood information;
   determining a third count of pixels, in the generated principal edge image, that correspond to a thickness of a boundary of an object present in the image;
   performing a row-wise autocorrelation of one or more gradient magnitudes of the generated noise reduced significant edge image to determine an autocorrelation profile associated with the each of one or more rows of pixels of the generated noise reduced significant edge image;
   determining a presence of convexity and a presence of combness in the determined autocorrelation profile associated with the each of one or more rows of pixels of the generated noise reduced significant edge image;
   determining, based on the determined presence of convexity and the determined presence of combness, a count of rows of each of one or more rows of pixels of the generated noise reduced significant edge image that correspond to the ghosting artefact associated with the object; and
   computing a confidence score indicative of a likelihood of occurrence of the ghosting artefact associated with the object, based on at least the computed inter-field average of absolute difference, the determined first count of pixels and the second count of pixels, the determined third count of pixels, and the determined count of rows of the generated noise reduced significant edge image that correspond to the ghosting artefact associated with the object.

2. The method according to claim 1, wherein the first mode corresponds to detection of an inter-field ghosting artefact associated with the object, and the second mode corresponds to detection of an analog ghosting artefact detection associated with the object.

3. The method according to claim 1, wherein the determined plurality of fields comprises one or more top fields and one or more bottom fields of the image.

4. The method according to claim 1, wherein the first predefined percentage of the maximum absolute gradient magnitude of a row of the one or more rows of the significant edge image is extracted by:
   determining a maximum absolute gradient magnitude for each row of the significant edge image;
   calculating a multiple of the determined maximum absolute gradient magnitude based on a first predefined constant.

5. The method according to claim 1, wherein the second predefined percentage of the maximum absolute gradient magnitude of a row of the one or more rows of the principal edge image is extracted by:

determining a maximum absolute gradient magnitude for each row of the principal edge image;

calculating a multiple of the determined maximum absolute gradient magnitude based on a second predefined constant.

6. The method according to claim 1, wherein generation of delta gradient image comprises;

subtraction of the gradient magnitudes of the pixels of the generated significant edge image from gradient magnitude of corresponding co-located pixels of the extracted edge image to generate raw delta gradient pixels;

comparing the generated raw delta gradient pixels with a threshold proportional to the maximum absolute gradient magnitude in each of the rows to remove noise gradients for generating the delta gradient image.

7. The method according to claim 1, wherein the generated boundary neighbourhood information is extracted by:

determining whether a pixel at a location in the principal edge image corresponds to the boundary of the principal edge image, and the pixels present in an immediate vicinity of the boundary of the principal edge image based on a first programmable parameter; and determining whether a pixel at a location in the principal edge image corresponds to the boundary of the principal edge image, and the pixels present in an extended vicinity of the boundary of the principal edge image based on a second programmable parameter.

8. The method of claim 1, wherein the spatial alignment is further based on the determined gradient angle and a comparison of the difference of a gradient angle of a pixel with the gradient angle of a reference pixel present at locations corresponding to non-zero pixels in the generated delta gradient image.

9. The method according to claim 1, wherein the count of rows of the generated noise reduced significant edge image that correspond to the ghosting artefact associated with the object, are determined based on determination of equidistant maxima in the determined autocorrelation profile associated with each row of the generated significant edge image.

10. The method of claim 9, wherein the presence of combness is determined based on:

determining local maximas present in the determined autocorrelation profile associated with each row of the generated significant edge image;

comparing a difference of magnitude of the determined local maximas with a combness threshold to determine significant local maximas;

determining a count of determined significant local maximas, which are equi-distant based on a computation of a second order difference between successive significant local maximas;

comparing the determined count of equi-distant significant local maximas with a programmable combness threshold.

11. The method according to claim 1, wherein the computed confidence score corresponds to a non-zero value when the determined first count of pixels is non-zero and the determined first count of pixels is greater than the determined second count of pixels.

12. A system for ghost detection in an image, the system comprising one or more processors configured to:

determine a mode of ghosting artefact detection based on one or more user inputs, the mode comprises a first mode and a second mode for ghosting artefact detection;

determine a plurality of fields based on splitting of the image into the plurality of fields, when the determined mode of ghosting artefact detection corresponds to the first mode;

generate a field overlay image based on the determined plurality of fields;

update the image based on the generated field overlay image;

compute an inter-field average of absolute difference between the determined plurality of fields of the updated image;

pre-process the image to filter out at least speckled noise;

extract an edge image by extraction of gradient magnitude and angle of each pixel of the pre-processed image;

determine a maximum absolute gradient magnitude for each row of the edge image based on the gradient magnitude of each pixel in each row of the edge image;

determine a first predefined percentage and a second predefined percentage of a maximum absolute gradient magnitude associated with each of one or more rows of pixels of the image;

generate a significant edge image, based on comparison of gradient magnitudes of each pixel in each of one or more rows of pixels of the significant edge image, with the determined first predefined percentage of the maximum absolute gradient magnitude of the row;

generate a noise reduced significant edge image based on performing median filtering on the generated significant edge image;

generate a principal edge image, based on comparison of gradient magnitudes of each pixel in each of one or more rows of pixels of the principal edge image, with the determined second predefined percentage of the maximum absolute gradient magnitude of the row;

generate boundary neighbourhood information based on the generated principal edge image;

generate a delta gradient image based on a processing of the determined edge image;

determine a first count of pixels and a second count of pixels, in the computed delta gradient image, based on a spatial alignment of one or more pixels in the delta gradient image and the generated boundary neighbourhood information;

determine a third count of pixels, in the generated principal edge image that correspond to a thickness of a boundary of an object present in the image;

perform a row-wise autocorrelation of one or more gradient magnitudes of the generated noise reduced significant edge image to determine an autocorrelation profile associated with the each of one or more rows of pixels of the generated noise reduced significant edge image;

determine a presence of convexity and a presence of combness in the determined autocorrelation profile associated with the each of one or more rows of pixels of the generated noise reduced significant edge image;

determine, based on the determined presence of convexity and the determined presence of combness, a count of rows of each of one or more rows of pixels of the generated noise reduced significant edge image that correspond to the ghosting artefact associated with the object; and compute a confidence score indicative of a likelihood of occurrence of the ghosting artefact associated with the object, based on at least the computed inter-field average of absolute difference, the determined first count of pixels and the second count of pixels, the determined third count of pixels, and the determined count of rows of the generated noise reduced significant edge image that correspond to the ghosting artefact associated with the object.

13. A computer program product tangibly embodied on a computer-readable storage medium and including executable code that causes at least one data processing apparatus to:

determine a mode of ghosting artefact detection based on one or more user inputs, the mode comprises a first mode and a second mode for ghosting artefact detection;

determine a plurality of fields based on splitting of the image into the plurality of fields, when the determined mode of ghosting artefact detection corresponds to the first mode;

generate a field overlay image based on the determined plurality of fields;

update the image based on the generated field overlay image;

compute an inter-field average of absolute difference between the determined plurality of fields of the updated image;

pre-process the image to filter out at least speckled noise;

extract an edge image by extraction of gradient magnitude and angle of each pixel of the pre-processed image;

determine a maximum absolute gradient magnitude for each row of the edge image based on the gradient magnitude of each pixel in each row of the edge image;

determine a first predefined percentage and a second predefined percentage of a maximum absolute gradient magnitude associated with each of one or more rows of pixels of the image;

generate a significant edge image, based on comparison of gradient magnitudes of each pixel in each of one or more rows of pixels of the significant edge image, with the determined first predefined percentage of the maximum absolute gradient magnitude of the row;

generate a noise reduced significant edge image based on performing median filtering on the generated significant edge image;

generate a principal edge image, based on comparison of gradient magnitudes of each pixel in each of one or more rows of pixels of the principal edge image, with the determined second predefined percentage of the maximum absolute gradient magnitude of the row;

generate boundary neighbourhood information based on the generated principal edge image;

generate a delta gradient image based on a processing of the determined edge image;

determine a first count of pixels and a second count of pixels, in the computed delta gradient image, based on a spatial alignment of one or more pixels in the delta gradient image and the generated boundary neighbourhood information;

determine a third count of pixels, in the generated principal edge image that correspond to a thickness of a boundary of an object present in the image;

perform a row-wise autocorrelation of one or more gradient magnitudes of the generated noise reduced significant edge image to determine an autocorrelation profile associated with the each of one or more rows of pixels of the generated noise reduced significant edge image;

determine a presence of convexity and a presence of combness in the determined autocorrelation profile associated with the each of one or more rows of pixels of the generated noise reduced significant edge image;

determine, based on the determined presence of convexity and the determined presence of combness, a count of rows of each of one or more rows of pixels of the generated noise reduced significant edge image that correspond to the ghosting artefact associated with the object; and compute a confidence score indicative of a likelihood of occurrence of the ghosting artefact associated with the object, based on at least the computed inter-field average of absolute difference, the determined first count of pixels and the second count of pixels, the determined third count of pixels, and the determined count of rows of the generated noise reduced significant edge image that correspond to the ghosting artefact associated with the object.

* * * * *